United States Patent
Kawada et al.

(10) Patent No.: US 12,051,796 B2
(45) Date of Patent: Jul. 30, 2024

(54) NEGATIVE ELECTRODE FOR NONAQUEOUS ELECTROLYTE SECONDARY BATTERY, NONAQUEOUS ELECTROLYTE SECONDARY BATTERY, AND METHOD FOR PRODUCING NEGATIVE ELECTRODE FOR NONAQUEOUS ELECTROLYTE SECONDARY BATTERY

(71) Applicant: Panasonic Intellectual Property Management Co., Ltd., Osaka (JP)

(72) Inventors: Hiroshi Kawada, Hyogo (JP); Hiroyuki Matsumoto, Tokyo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 541 days.

(21) Appl. No.: 17/336,566

(22) Filed: Jun. 2, 2021

(65) Prior Publication Data

US 2021/0296632 A1    Sep. 23, 2021

Related U.S. Application Data (60) Division of application No. 16/357,517, filed on Mar. 19, 2019, now Pat. No. 11,069,886, which is a
(Continued)

(30) Foreign Application Priority Data

Sep. 23, 2016 (JP) .................. 2016-185957
Aug. 31, 2017 (JP) .................. 2017-167582

(51) Int. Cl.
    *H01M 4/131* (2010.01)
    *H01M 4/04* (2006.01)
(Continued)

(52) U.S. Cl.
    CPC ......... *H01M 4/131* (2013.01); *H01M 4/0428* (2013.01); *H01M 4/133* (2013.01);
(Continued)

(58) Field of Classification Search
    CPC .... H01M 4/131; H01M 4/0428; H01M 4/133; H01M 4/136; H01M 4/139; H01M 4/366;
(Continued)

(56) References Cited

U.S. PATENT DOCUMENTS

2007/0117024 A1   5/2007   Nakai et al.
2009/0061325 A1   3/2009   Odani et al.
(Continued)

FOREIGN PATENT DOCUMENTS

JP   2000-67865 A   3/2000
JP   2002-083602 A   3/2002
(Continued)

OTHER PUBLICATIONS

JP decision to grant a Patent (Year: 2022).*
(Continued)

*Primary Examiner* — Alexander Usyatinsky
(74) *Attorney, Agent, or Firm* — WHDA, LLP (57) ABSTRACT

A method for producing a negative electrode for a nonaqueous electrolyte secondary battery, and a nonaqueous electrolyte secondary battery obtained therewith are disclosed. The negative electrode includes a negative electrode current collector, a negative electrode active material layer provided on the surface of the negative electrode current collector, and a first film which has lithium ion permeability and which coats at least a portion of the surface of the negative electrode active material layer and partially coats the surface of the negative electrode current collector. The first film preferably contains a first lithium compound containing an element $M^1$, an element $A^1$, and lithium. Herein, $M^1$ is at
(Continued)

least one selected from the group consisting of P, Si, B, V, Nb, W, Ti, Zr, Al, Ba, La, and Ta; and $A^1$ is at least one selected from the group consisting of F, S, O, N, and Br.

8 Claims, 1 Drawing Sheet

Related U.S. Application Data continuation of application No. PCT/JP2017/032763, filed on Sep. 12, 2017.

(51) Int. Cl.
| | |
|---|---|
| *H01M 4/133* | (2010.01) |
| *H01M 4/136* | (2010.01) |
| *H01M 4/139* | (2010.01) |
| *H01M 4/36* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC .......... *H01M 4/136* (2013.01); *H01M 4/139* (2013.01); *H01M 4/366* (2013.01); *H01M 4/485* (2013.01); *H01M 4/505* (2013.01); *H01M 4/525* (2013.01); *H01M 4/58* (2013.01); *H01M 4/587* (2013.01); *H01M 4/621* (2013.01); *H01M 10/0525* (2013.01); *H01M 2004/027* (2013.01); *Y02E 60/10* (2013.01); *Y02T 10/70* (2013.01)

(58) Field of Classification Search
CPC ...... H01M 4/485; H01M 4/505; H01M 4/525; H01M 4/58; H01M 4/587; H01M 4/621; H01M 10/0525; H01M 2004/027; Y02E 60/10; Y02T 10/70
See application file for complete search history.

(56) References Cited

U.S. PATENT DOCUMENTS

| | | | |
|---|---|---|---|
| 2009/0136855 | A1 | 5/2009 | Yamaguchi et al. |
| 2009/0181311 | A1 | 7/2009 | Iwanaga et al. |
| 2009/0263726 | A1 | 10/2009 | Yamaguchi et al. |
| 2011/0086274 | A1 | 4/2011 | Chang et al. |
| 2011/0099798 | A1 | 5/2011 | Nilsen et al. |
| 2011/0311882 | A1* | 12/2011 | Kim ................. H01M 10/0562 |
| | | | 429/231.95 |
| 2012/0077082 | A1 | 3/2012 | Se-Hee et al. |
| 2013/0177808 | A1* | 7/2013 | Wang ................ H01M 10/4235 |
| | | | 429/231.95 |
| 2014/0205905 | A1* | 7/2014 | Xiao .................... H01M 4/049 |
| | | | 429/231.5 |
| 2015/0180036 | A1 | 6/2015 | Takebayashi |
| 2016/0351973 | A1* | 12/2016 | Albano ................ H01M 4/628 |
| 2017/0207456 | A1 | 7/2017 | Liu et al. |
| 2017/0244133 | A1* | 8/2017 | Nowatari ............. H01M 4/525 |

FOREIGN PATENT DOCUMENTS

| | | |
|---|---|---|
| JP | 2003-173770 A | 6/2003 |
| JP | 2007-141733 A | 6/2007 |
| JP | 2009-076433 A | 4/2009 |
| JP | 2009-129893 A | 6/2009 |
| JP | 2009-163890 A | 7/2009 |
| JP | 2009-193696 A | 8/2009 |
| JP | 2013-143375 A | 7/2013 |
| JP | 2014-103098 A | 6/2014 |
| JP | 5922410 B2 | 5/2016 |
| JP | 6071969 B2 | 2/2017 |
| JP | 2017-97999 A | 6/2017 |
| WO | 2007/139130 A1 | 12/2007 |
| WO | 2015/050254 A1 | 4/2015 |
| WO | 2016/051656 A1 | 4/2016 |
| WO | WO-2016051656 A1 * | 4/2016 ........ H01M 10/0525 |

OTHER PUBLICATIONS

SIPO Notice to grant a Patent (Year: 2022).*
International Search Report dated Nov. 28, 2017, issued in counterpart Application No. PCT/JP2017/032763 (2 pages).

* cited by examiner

NEGATIVE ELECTRODE FOR NONAQUEOUS ELECTROLYTE SECONDARY BATTERY, NONAQUEOUS ELECTROLYTE SECONDARY BATTERY, AND METHOD FOR PRODUCING NEGATIVE ELECTRODE FOR NONAQUEOUS ELECTROLYTE SECONDARY BATTERY

CROSS-REFERENCE TO RELATED APPLICATIONS

This application is a Division of U.S. patent application Ser. No. 16/357,517, filed Mar. 19, 2019, which is a Bypass Continuation of International Patent Application No. PCT/JP2017/032763, filed Sep. 12, 2017, and claims the benefit of Japanese Patent Application Nos. 2016-185957 and 2017-167582, filed Sep. 23, 2016 and Aug. 31, 2017, respectively, each of which is incorporated by reference herein in its entirety.

TECHNICAL FIELD

The present invention relates to improvement in a negative electrode for a nonaqueous electrolyte secondary battery.

BACKGROUND ART

A nonaqueous electrolyte secondary battery represented by a lithium ion battery causes irreversible reaction of a portion of a nonaqueous electrolyte, which contains a nonaqueous solvent and a lithium salt, in the surface of a negative electrode active material in association with charge and discharge. In this case, a solid electrolyte interface (SEI) is produced so as to coat the surface of the negative electrode active material. In general, SEI is most produced in charging of a nonaqueous electrolyte secondary battery immediately after assembly. The more the amount of SEI produced, the higher the irreversible capacity and the lower the battery capacity.

Therefore, from the viewpoint of suppressing the production of SEI, it is proposed that the surface of a negative electrode material mainly composed of carbon is coated with a lithium compound represented by $Li_xSi_yO_z$ (100y/(x+y) =10 to 80) (Patent Literature 1).

CITATION LIST

Patent Literature

PTL 1: Japanese Published Unexamined Patent Application No. 2000-67865

SUMMARY OF INVENTION

In Patent Literature 1, specifically, a negative electrode is formed by mixing a carbon material, a lithium compound, and a binder to prepare a paste, and applying and drying the paste on a negative electrode current collector. However, the lithium compound has substantially no electron conductivity, and thus the more the surface of the carbon material is coated with the lithium compound, the higher the internal resistance of a negative electrode active material layer. Therefore, the surface of the carbon material cannot be sufficiently coated with the lithium compound, and thus the effect of suppressing the occurrence of SEI is limited.

In consideration of the above, an aspect of the present disclosure relates to a negative electrode for a nonaqueous electrolyte secondary battery, the negative electrode including a negative electrode current collector, a negative electrode active material layer provided on the surface of the negative electrode current collector, and a first film which has lithium ion permeability and which coats at least a portion of the surface of the negative electrode active material layer and partially coats the surface of the negative electrode current collector.

Another aspect of the present disclosure relates to a nonaqueous electrolyte secondary battery including a positive electrode, the negative electrode, and a lithium-ion conductive nonaqueous electrolyte.

A negative electrode for a nonaqueous electrolyte secondary battery of the present disclosure can decrease the amount of SEI produced while suppressing a decrease in battery capacity.

DESCRIPTION OF EMBODIMENTS

A negative electrode for a nonaqueous electrolyte secondary battery according to an embodiment of the present invention includes a negative electrode current collector, a negative electrode active material layer provided on the surface of the negative electrode current collector, and a first film which has lithium ion permeability and which coats at least a portion of the surface of the negative electrode active material layer and partially coats the surface of the negative electrode current collector. When the surface of the negative electrode active material layer is coated with the first film having lithium ion permeability, such a film that divides the electron conductive path already formed is not formed, and, on the surface of the negative electrode active material layer, a part serving as a starting point of decomposition of a nonaqueous electrolyte can be selectively coated. Thus, the amount of SEI produced can be effectively decreased, and an increase in internal resistance of the negative electrode active material layer can be suppressed.

The surface of the negative electrode active material layer is not limited to the surface of the negative electrode active material layer on the side facing a positive electrode through a separator and includes the inner walls of voids in the porous negative electrode active material layer. The first film which coats the surface of the negative electrode active material layer preferably enters into the voids and coats the inner walls thereof in the negative electrode active material layer.

When the first film is formed after the negative electrode active material layer is formed, the first film can partially coat the surface of the negative electrode current collector. As microscopically viewed, the surface of the negative electrode current collector is not completely coated with the negative electrode active material and the binder but has very small exposed surface. Also, a cut end surface or a lead mounting part of the negative electrode current collector may be exposed. Coating such an exposed surface with the first film also suppresses decomposition of the nonaqueous electrolyte with the surface of the negative electrode current collector as a starting point.

When the negative electrode active material layer includes a mixture containing the negative electrode active material, the binder, etc., the first film which coats the surface of the negative electrode active material layer is formed on the surface of the negative electrode active material layer after formation thereof by mixing negative electrode active material particles and the binder. Therefore, unlike in the case where the first film is previously formed on the negative electrode active material particles, there may be present a region without the first film interposed at the bond interfaces between the negative electrode active material particles and the binder. Similarly, there may be present a region without the first film interposed at the contact interfaces between the negative electrode active material particles and the negative electrode current collector. Further, there may be present a region without the first film interposed at the contact interfaces between the adjacent negative electrode active material particles.

When the first film is formed after the negative electrode active material layer is formed, the first film can partially coat the surface of the binder. In addition, when the negative electrode active material layer contains a conductive agent, the first film can partially coat the surface of the conductive agent. This also suppresses decomposition of the nonaqueous electrolyte with the binder and the conductive agent as a starting point.

However, in order to coat the surface of the binder with the first film, the first film is required to be formed at a temperature lower than the heat resistant temperature of the binder. The heat resistant temperature of the binder varies with the types of binders, but the standard temperature for forming the first film is preferably 200° C. or less and more preferably 120° C. or less.

The first film which coats the surface of the negative electrode active material layer may be one having lithium-ion permeability and being capable of suppressing the production of SEI. A material constituting the first film is, for example, a first lithium compound (also referred to as a "first compound" hereinafter) containing element $M^1$, element $A^1$, and lithium. The element $M^1$ is at least one selected from the group consisting of P, Si, B, V, Nb, W, Ti, Zr, Al, Ba, La, and Ta, and the element $A^1$ is at least one selected from the group consisting of F, S, O, N, and Br. Among the elements $M^1$, at least one selected from the group consisting of P, Si, and B is particularly preferred in view of low raw material cost. In particular, the element $M^1$ preferably contains at least P.

Even when the surface of the negative electrode active material layer is coated with the first compound, it is difficult to completely prevent decomposition of the nonaqueous electrolyte proceeding in a battery. Thus, SEI may be further produced outside the first compound. In this case, the surface of the negative electrode active material layer is coated with the first film having an inner layer and an outer layer. In general, the inner layer and the outer layer have different constituent element compositions, and one of the inner layer and the outer layer contains an element not contained in the other of the inner layer and the outer layer. That is, the inner layer mainly contains the first compound, and the outer layer contains a compound (referred to as a "third compound" hereinafter) different from the first compound. The third compound contains an element derived from a component contained in the nonaqueous electrolyte.

When the first film has the inner layer and the outer layer, analysis of the structure of the first film in the thickness direction of the film indicates that the concentration C1 of the first compound (or at least one selected from the element $M^1$, the element $A^1$, and lithium as the constituent elements of the first compound) is low on the surface side (outer layer side) of the first film, and is high on the bond interface side between the first film and the negative electrode active material layer or on the bond interface side (inner layer side) between the first film and the negative electrode current collector. The expression "the surface side (outer layer side) of the first film" represents the surface opposite to the bond interface between the first film and the negative electrode active material particles or the negative electrode current collector. The concentration C1 decreases toward the negative electrode active material particles or the negative electrode current collector with a boundary near the bond interface between the first film and the negative electrode active material particles or the negative electrode current collector. Therefore, the concentration C1 has a maximum value in the direction from the surface side of the first film to the bond interface between the first film and the negative electrode active material particles or the negative electrode current collector. The analysis can be performed by XPS, EPMA, etc.

The concentration $C1_{max}$ at the maximum value of the first compound (or at least one selected from the element $M^1$, the element $A^1$, and lithium) is preferably 1.5 or more times, more preferably 2 or more times, and still more preferably 5 or more times as high as the concentration C1, on the surface side of the first film. This is because it is considered that the surface of the negative electrode active material layer is sufficiently coated with the first compound, thereby suppressing the production of SEI. The surface side of the first film may be a region from the outermost surface of the first film to a depth within 15% of the thickness of the first film.

The first compound is preferably a polyanion lithium salt. The polyanion represents a molecular ion species represented by, for example, the composition formula (1): $[M^1A^1_{y1}]^{x1-}$. However, the number of center atoms $M^1$ is not limited to 1, and the center atoms $M^1$ is not limited to one type. The polyanion lithium salt represented by the composition formula (1): $Li_{x1}M^1A^1_{y1}$ containing the element $M^1$ and the element $A^1$ contains an $A^1$-Li bond (for example, O—Li bond) having ionic bonding and exhibits lithium ion conductivity due to lithium ion hopping between $A^1$ sites. The first compound is particularly preferably a polyoxometalate compound in view of stability. The ranges of x1 and y1 are, for example, preferably $0.5 \leq x1 \leq 4$ and $1 \leq y1 \leq 6$, respectively.

Examples of the polyoxometalate compound include $Li_3PO_4$, $Li_4SiO_4$, $Li_2Si_2O_5$, $Li_2SiO_3$, $Li_3BO_3$, $Li_3VO_4$, $Li_3NbO_4$, $LiZr_2(PO_4)_3$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, $Li_{1.3}Al_{0.3}Ti_{1.7}(PO_4)_3$, and the like, and these can be used alone or in any combination. In particular, at least one selected from $Li_3PO_4$, $Li_4SiO_4$, $Li_2Si_2O_5$, $Li_2SiO_3$, $Li_3BO_3$, $Li_3VO_4$, and $Li_3NbO_4$ is preferably used in view of excellent lithium ion permeability and at least $Li_3PO_4$ is more preferably contained.

In addition, lithium silicates such as $Li_4SiO_4$, $Li_2Si_2O_5$, $Li_2SiO_3$, and the like have good compatibility with silicon-containing alloy-based negative electrode active materials (silicon oxides, silicon alloys, and the like). In particular, $Li_4SiO_4$ is preferred in terms of little occurrence of side reaction accompanied by gas generation and in terms of relatively low cost. $Li_4SiO_4$ having a high lithium content is considered to have little occurrence of side reaction to take in lithium ions. The polyoxometalate compound preferably contains at least $Li_4SiO_4$.

An example of a sheet-shaped negative electrode constituting a wound-type electrode group or laminated-type electrode group is described in further detail below.

(Negative Electrode)

The sheet-shaped negative electrode includes a sheet-shaped negative electrode current collector, a negative electrode active material layer formed on the surface of the negative electrode current collector, and a first film formed on the surface of the negative electrode active material layer. The negative electrode active material layer may be formed on one of the surfaces or both surfaces of the negative electrode current collector.

(Negative Electrode Current Collector)

Examples of the negative electrode current collector include a metal foil, a metal sheet, a mesh body, a punching sheet, an expand metal, and the like. Examples of a material which can be used for the negative electrode current collector include stainless steel, nickel, copper, copper alloys, and the like. The thickness of the negative electrode current collector can be selected from, for example, a range of 3 to 50 μm.

(Negative Electrode Active Material Layer)

Described is a case where the negative electrode active material layer includes a mixture containing negative electrode active material particles. The negative electrode active material layer may contain the negative electrode active material and the binder as essential components and a conductive agent as an optional component. The amount of the binder contained in the negative electrode active material layer is preferably 0.1 to 20 parts by mass and more preferably 1 to 5 parts by mass relative to 100 parts by mass of the negative electrode active material. The thickness of the negative electrode active material layer is, for example, 10 to 100 μm.

The negative electrode active material may be either a non-carbon material or a carbon material and may be a combination thereof. In general, the carbon material adsorbs or releases lithium ions at a potential of 1 V or less with respect to metal lithium. In the potential region, reductive decomposition of the constituent element of the nonaqueous electrolyte easily proceeds on the surface of the carbon material, thereby easily producing SEI. When the surface of the negative electrode active material layer is coated with the first film having lithium ion permeability, the contact between the carbon material and the nonaqueous electrolyte is suppressed, suppressing the production of SEI.

The carbon material used as the negative electrode active material is not particularly limited, but is, for example, preferably at least one selected from the group consisting of graphite and hard carbon. In particular, graphite has a high capacity and a low irreversible capacity and is thus promising. In addition, graphite has high stability to reductive decomposition of the nonaqueous electrolyte and thus exhibits a significant effect by coating the surface of the negative electrode active material layer with the first film.

Graphite is a generic name for carbon materials having a graphite structure and includes natural graphite, artificial graphite, expanded graphite, graphitized mesophase carbon particles, and the like. Examples of the natural graphite include flake-like graphite, earth-like graphite, and the like. A carbon material having a graphite structure with a 002 plane-spacing $d_{002}$ of 3.35 to 3.44 angstroms, which is calculated from an X-ray diffraction spectrum, is generally classified into graphite. On the other hand, hard carbon is a carbon material in which fine graphite crystals are arranged in random directions and further graphitization substantially does not proceed, and the 002 plane-spacing $d_{002}$ is larger than 3.44 angstroms.

The noncarbon material used as the negative electrode active material is preferably an alloy-based material. The alloy-based material preferably contains silicon or tin and is particularly preferably a silicon single material or silicon compound. The silicon compound includes a silicon oxide and a silicon alloy.

From the viewpoint of enhancing the packing properties of the negative electrode active material in the negative electrode active material layer, the average particle diameter (D50) of the negative electrode active material particles is desirably sufficiently small relative to the thickness of the negative electrode active material layer. The average particle diameter (D50) of the negative electrode active material particles is, for example, preferably 5 to 30 μm and more preferably 10 to 25 μm. The average particle diameter (D50) represents the median diameter at a cumulative volume of 50% in a volume-based particle size distribution. The average particle diameter is measured by, for example, using a laser diffraction/scattering particle size distribution analyzer.

Examples of the binder include fluorocarbon resins such as polyvinylidene fluoride (PVdF), polytetrafluoroethylene (PTFE), tetrafluoroethylene-hexafluoropropylene copolymer (HFP), and the like; acrylic resins such as polymethyl acrylate, ethylene-methyl methacrylate copolymer, and the like; rubber materials such as styrene-butadiene rubber (SBR), acrylic rubber, and the like; water-soluble polymers such as carboxymethyl cellulose (CMC), polyvinylpyrrolidone, and the like; and the like.

The conductive agent is preferably carbon black such as acetylene black, Ketjen black, or the like.

The negative electrode active material layer is formed by mixing the negative electrode active material particles, the binder, etc. with a dispersion medium to prepare a negative electrode slurry, applying and drying the negative electrode slurry on the surface of the negative electrode current collector, and then rolling the slurry. Usable examples of the dispersion medium include water, alcohols such as ethanol and the like, ethers such as tetrahydrofuran and the like, N-methyl-2-pyrrolidone (NMP), and the like. When water is used as the dispersion medium, a rubber material and a water-soluble polymer are preferably used in combination as the binder.

(First Film Having Lithium Ion Permeability)

The first film having lithium ion permeability, which coats the surface of the negative electrode active material layer, is formed by, for example, exposing a negative electrode precursor, which includes the negative electrode current collector and the negative electrode active material layer provided on the surface of the negative electrode current collector, in an atmosphere containing the raw material of the first film at 200° C. or less.

The thickness of the first film which coats the surface of the negative electrode active material layer may be a thickness with which the contact between the negative electrode active material and the nonaqueous electrolyte can be suppressed. The first film is preferably formed as a homogenous layer which coats the surface of the negative electrode active material layer in a necessary and sufficient amount. Therefore, the thickness of the first film is preferably smaller than the average particle diameter of the particles of the negative electrode active material, and is, for example, preferably 0.1 μm (100 nm) or less and more preferably 0.03 μm (30 nm) or less. However, with the first film having an excessively small thickness, for example, electron transfer due to the tunneling effect may proceed, and thus reductive decomposition of the nonaqueous electrolyte may proceed. From the viewpoint of suppressing the electron transfer and smoothly moving lithium ions, the thickness of the first film is preferably 0.5 nm or more.

The first film is formed after the negative electrode active material layer is formed. Therefore, a region without the first film formed therein may be present at the contact interfaces between the negative electrode active material particles and at the bond interfaces between the negative electrode active material particles and the binder.

The lithium ion permeability of the first film may be a level at which the lithium ions present near the negative electrode active material particles can move in and out the negative electrode active material particles, and is not required to reach a high degree of lithium ion conductivity. The first film may be, for example, a material having a lithium ion conductivity of $1.0 \times 10^{-9}$ S/cm or more, preferably $1.0 \times 10^{-8}$ S/cm or more. On the other hand, from the viewpoint of suppressing as much as possible the reductive decomposition of the nonaqueous electrolyte, the first film preferably has low electron conductivity, preferably an electron conductivity of lower than $1.0 \times 10^{-2}$ S/cm.

From the viewpoint of securing the capacity of the negative electrode, the content ratio of the first film occupying the negative electrode is preferably as low as possible. From the viewpoint of facilitating lithium ion movement in and out of the negative electrode active material particles, the first film is preferably formed as thinly and homogeneously as possible. Therefore, the amount the first film contained in the negative electrode is preferably 0.01 to 10 parts by mass and more preferably 0.05 to 5 parts by mass relative to 100 parts by mass of the negative electrode active material.

Next, a method for producing the negative electrode for a nonaqueous electrolyte secondary battery according to an embodiment of the present invention includes (i) a step of preparing a negative electrode precursor including a negative electrode current collector and a negative electrode active material layer provided on the surface of the negative electrode current collector, and (ii) a step of partially coating the surface of the negative electrode current collector together with at least a portion of the surface of the negative electrode active material layer with a first film having lithium ion permeability.

In the step (ii), the negative electrode precursor is preferably exposed in an atmosphere containing the raw material of the first film at 200° C. or less, preferably 120° C. or less, to form the first film. Therefore, even when the negative electrode active material layer contains the binder having a low heat resistant temperature, the first film can be formed on the surface of the negative electrode active material layer without deterioration in the binder. In addition, the surface of the binder can be coated with the first film without deterioration in the binder. The first film can be formed by a liquid phase method or a vapor phase method.

The liquid phase method is preferably a precipitation method, a sol-gel method, or the like. The precipitation method is a method of precipitating the constituent material of the first film on the surfaces of the negative electrode active material layer and of the negative electrode current collector by immersing the negative electrode precursor in a solution dissolving the raw material of the first film at a temperature sufficiently lower than 120° C. The sol-gel method is a method of immersing the negative electrode precursor in a liquid containing the raw material of the first film at a temperature sufficiently lower than 120° C., and then depositing and gelling first film intermediate particles on the surfaces of the negative electrode active material layer and of the negative electrode current collector.

Examples of the vapor phase method include a physical vapor deposition method (PVD), a chemical vapor deposition method (CVD), an atomic layer deposition method (ALD), and the like. PVD and CVD are generally performed at a high temperature exceeding 200° C. On the other hand, ALD can form the first film in an atmosphere containing the raw material of the first film at 200° C. or less and further 120° C. or less.

The ALD method uses an organic compound having high vapor pressure as the raw material of the first film. Vaporization of the raw material can cause interaction between the molecular raw material and the surfaces of the negative electrode active material layer and of the negative electrode current collector. The molecular raw material can be easily reached to voids in the negative electrode active material layer and thus can easily form the homogeneous first film even on the inner walls of the voids.

The ALD method forms the first film which coats the negative electrode active material layer and the negative electrode current collector, for example, according to the following procedures.

First, a gaseous first raw material is introduced into a reaction chamber containing the negative electrode precursor. This causes the negative electrode precursor to be exposed to an atmosphere containing the first raw material. Then, when the surface of the negative electrode precursor is coated with a monomolecular layer of the first raw material, the self-termination mechanism of an organic group possessed by the first raw material functions to stop further adsorption of the first raw material on the surface of the negative electrode precursor. The excessive first raw material is removed from the reaction chamber by purging with inert gas.

Next, a gaseous second raw material is introduced into the reaction chamber containing the negative electrode precursor. This causes the negative electrode precursor to be exposed to an atmosphere containing the second raw material. In this case, when reaction of the monomolecular layer of the first raw material with the second raw material is terminated, the second raw material is not further adsorbed on the surface of the negative electrode precursor. The excessive second raw material is removed from the reaction chamber by purging with inert gas.

As described above, a first lithium compound (first compound) containing the element $M^1$, the element $A^1$, and lithium is produced by repeating a series of operations including introduction of the first raw material, purging, introduction of the second raw material, and purging, thereby forming the first film having lithium ion permeability.

The materials used as the first raw material and the second raw materials in the ALD method are not particularly limited and proper compounds may be selected according to the desired first film. Examples of the first raw material include materials containing phosphorus as the element $M^1$ (trimethyl phosphate, triethyl phosphate, tris(dimethylamino) phosphine, trimethylphosphine, and the like), materials containing silicon as the element $M^1$ (tetramethyl orthosilicate, tetraethyl orthosilicate, and the like), materials containing both the element $M^1$ and lithium (lithium bis(trimethylsilyl) amide and the like), and materials serving as a supply source of lithium (lithium tertiary butoxide, lithium cyclopentadienyl, and the like).

When a material containing the element $M^1$ is used as the first raw material, a material serving as a supply source of lithium (or a material containing both the element $M^1$ and lithium) is used as the second raw material. When a material serving as a supply source of lithium is used as the first raw material, a material containing the element $M^1$ (or a material containing both the element $M^1$ and lithium) is used as the second raw material. When a material containing both the element $M^1$ and lithium is used as the first raw material, an oxidizer (oxygen, ozone, or the like) may be used as the second raw material.

Further, in order to promote the reaction of each of the raw materials, an oxidizer may be introduced into the reaction chamber and may be used in combination with the other raw materials with any timing in the series of operations. The oxidizer may be introduced with any timing in the repetition of the series of operations or at each time of repetition.

In addition, three or more raw materials may be used. That is, one or more raw materials other than the first raw material and the second raw material may be used. For example, a series of operations including introduction of the first raw material, purging, introduction of the second raw material, purging, introduction of a third raw material different from both the first raw material and the second raw material, and purging may be repeated.

Each of the constituent elements other than the negative electrode in a prismatic wound-type battery as an example is described in detail below. However, the type, shape, etc. of the nonaqueous electrolyte secondary battery are not particularly limited.

Figure 1:
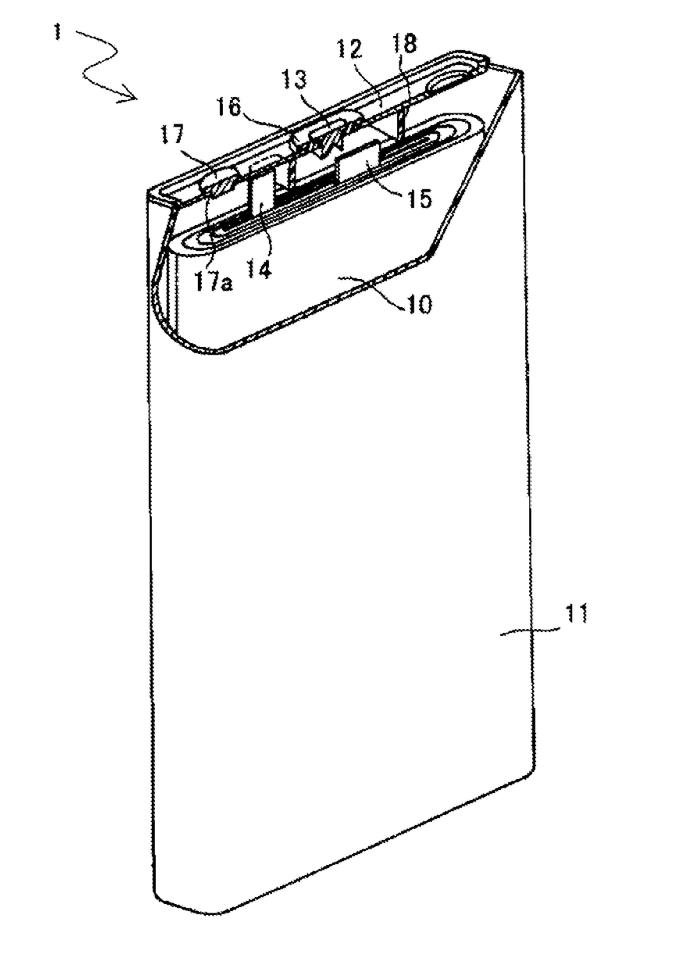
FIG. 1 is a partially cut-away perspective view of a nonaqueous electrolyte secondary battery according to an embodiment of the present invention.

FIG. 1 is a perspective view schematically showing a prismatic nonaqueous electrolyte secondary battery according to an embodiment of the present invention. FIG. 1 is a partially cut-away view for showing the structure of principal parts of a nonaqueous electrolyte secondary battery 1. A prismatic battery case 11 houses a flat-shape wound-type electrode group 10 and a nonaqueous electrolyte (not shown).

One of the ends of a positive electrode lead 14 is connected to a positive electrode current collector of a positive electrode contained in the electrode group 10. The other end of the positive electrode lead 14 is connected to a sealing plate 12 functioning as a positive electrode terminal. One of the ends of a negative electrode lead 15 is connected to a negative electrode current collector, and the other end of the negative electrode lead 15 is connected to a negative electrode terminal 13 provided at a substantially center of the sealing plate 12. In addition, a gasket 16 is disposed between the sealing plate 12 and the negative electrode terminal 13 to insulate both. Further, a frame body 18 made of an insulating material is disposed between the sealing plate 12 and the electrode group 10 to insulate the negative electrode lead 15 and the sealing plate 12. The sealing plate 12 is bonded to an opening end of the prismatic battery case 11, sealing the prismatic battery case 11. A liquid injection hole 17a is formed in the sealing plate 12 so that the nonaqueous electrolyte is injected into the prismatic battery case 11 from the liquid injection hole 17a. Then, the liquid injection hole 17a is sealed with a plug 17.

(Positive Electrode)

A sheet-shaped positive electrode includes a sheet-shaped positive electrode current collector and a positive electrode active material layer held on the surface of the positive electrode current collector. Examples of the positive electrode current collector include a metal foil, a metal sheet, and the like. Usable examples of the material of the positive electrode current collector include stainless steel, aluminum, aluminum alloys, titanium, and the like. The positive electrode active material layer can be formed by a method using a positive electrode slurry containing a positive electrode active material, a binder, and a dispersion medium according to the production of the negative electrode active material layer. If required, the positive electrode active material layer may contain an option component such as a conductive agent or the like.

The positive electrode active material is preferably a lithium transition metal oxide. Examples of a transition metal element include Sc, Y, Mn, Fe, Co, Ni, Cu, Cr, and the like. Among these, Mn, Co, and Ni are preferred, and Ni is particularly preferred. The lithium transition metal oxide is more preferably lithium-nickel composite oxide containing Li, Ni, and another metal.

The lithium-nickel composite oxide is represented by, for example, the composition formula (2): $Li_aNi_bM^3_{1-b}O_2$ ($M^3$ at least one selected from the group consisting of Mn, Co, and Al, $0<a\leq1.2$, and $0.3\leq b\leq1$). In particular, from the viewpoint of higher capacity, it is preferred to satisfy $0.85<b\leq1$. Further, from the viewpoint of stability of a crystal structure, the lithium-nickel composite oxide is preferably represented by the composition formula (3): $Li_aNi_bCo_cM^4_dO_2$ ($M^4$ is at least one of Mn and Al, $0<a\leq1.2$, $0.85<b<1$, $0<c<0.15$, $0<d\leq0.1$, and $b+c+d=1$).

Examples of the lithium-nickel composite oxide include lithium-nickel-cobalt-manganese composite oxides ($LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$, and the like), lithium-nickel-manganese composite oxides ($LiNi_{0.5}Mn_{0.5}O_2$ and the like), lithium-nickel-cobalt composite oxides ($LiNi_{0.8}Co_{0.2}O_2$ and the like), lithium-nickel-cobalt-aluminum composite oxides ($LiNi_{0.8}Co_{0.15}Al_{0.05}O_2$, $LiNi_{0.8}Co_{0.18}Al_{0.02}O_2$, $LiNi_{0.88}Co_{0.09}Al_{0.03}O_2$, and the like), and the like.

The surface of the positive electrode active material layer may be at least partially coated with a second film having lithium ion permeability. The second film is formed, for example, after the positive electrode active material layer is formed. In this case, the second film can coat the surface of the positive electrode active material layer and partially coat the surface of the positive electrode current collector. The amount of the second film contained in the positive electrode is preferably 0.05 to 10 parts by mass and more preferably 0.1 to 5 parts by mass relative to 100 parts by mass of the positive electrode active material.

Examples of the material constituting the second film include the same materials as those of the first film. The second film contains a second lithium compound represented by, for example, the following composition formula (4):

$$Li_{x2}M^2A^2_{y2}$$

(In the formula, $M^2$ is at least one selected from the group consisting of P, Si, B, V, Nb, W, Ti, Zr, Al, Ba, La, and Ta, $A^2$ is at least one selected from the group consisting of F, S, O, N, and Br, $0.5\leq x2\leq 4$, and $1\leq y2\leq 6$.) However, the number of center atoms $M^2$ is not limited to one, and the number of types of center atoms $M^2$ is not limited one.

The first lithium compound contained in the first film and the second lithium compound contained in the second film may be the same or different. A method for forming the second film is, for example, the same method as for forming the first film.

(Separator)

A resin-made microporous film, a nonwoven fabric, a woven fabric, or the like is used as the separator. Usable examples of a resin include polyolefins such as polyethylene (PE), polypropylene (PP), and the like, polyamide, polyamide-imide, and the like.

(Nonaqueous Electrolyte)

The nonaqueous electrolyte contains a nonaqueous solvent and a solute dissolved in the nonaqueous solvent. Various lithium salts are used as the solute. The concentration of lithium salt in the nonaqueous electrolyte is, for example, 0.5 to 1.5 mol/L.

Examples of the nonaqueous solvent include cyclic carbonate esters such as propylene carbonate (PC), ethylene carbonate (EC), and the like; linear carbonate esters such as diethyl carbonate (DEC), ethylmethyl carbonate (EMC), dimethyl carbonate (DMC), and the like; chain carboxylate esters such as γ-butyrolactone, γ-valerolactone, and the like; and the like. The nonaqueous solvents may be used alone or in combination of two or more.

Examples of a lithium salt include $LiPF_6$, $LiBF_4$, $LiClO_4$, $LiAsF_6$, $LiCF_3SO_3$, $LiN(SO_2F)_2$, $LiN(SO_2CF_3)_2$, and the like. The lithium salts may be used alone or in combination of two or more.

EXAMPLES

The present invention is specifically described based on examples and comparative examples below, but the present invention is not limited to these examples.

Example 1

A coin-shaped cell using metal lithium as a counter electrode was formed according to the following procedures.

(1) Formation of negative electrode Natural graphite particles (average particle diameter (D50): 15 μm) used as a negative electrode active material and a binder were mixed with a proper amount of water to prepare a negative electrode slurry. SBR and CMC were used in combination as the binder. The amounts of SBR and CMC mixed were 1 part by mass and 1 part by mass, respectively, relative to 100 parts by mass of the natural graphite particles.

The negative electrode slurry was applied on one of the surfaces of a copper foil (negative electrode current collector) having a thickness of 10 μm, and the coating film was dried and then rolled to form a negative electrode precursor. The total thickness of the negative electrode active material layer and the negative electrode current collector was 150 μm. The negative electrode precursor was punched into a disk shape having a diameter of 9 mm.

The negative electrode precursor was housed in a predetermined reaction chamber in which a first film with lithium ion permeability was formed on the surface of the negative electrode precursor according to the following procedures.

(i) In the reaction chamber housing the negative electrode precursor, a first raw material (trimethyl phosphate) serving as a supply source of the element $M^1$ (phosphorus: P) and the element $A^1$ (oxygen: O) was vaporized and introduced. An atmosphere containing the first raw material was controlled to a temperature of 120° C. and a pressure of 260 Pa. Thirty seconds after, the surface of the negative electrode precursor was considered to be coated with a monomolecular layer of the first raw material, and the excessive first raw material was purged with nitrogen gas.

(ii) Next, in the reaction chamber housing the negative electrode precursor, a second raw material (lithium bis (trimethylsilyl)amide) serving as a supply source of lithium was vaporized and introduced. An atmosphere containing the second raw material was controlled to a temperature of 120° C. and a pressure of 260 Pa. Thirty seconds after, the monomolecular layer of the first raw material was considered to react with the second raw material, and the excessive second raw material was purged with nitrogen gas.

(iii) A series of operations including introduction of the first raw material, purging, introduction of the second raw material, and purging was repeated 100 times to form a first film of a first lithium compound (first compound).

Analysis of the composition of the first film by XPS, ICP, etc. showed that the composition is lithium phosphate having the composition formula $Li_3PO_4$.

The mass of the first film per 100 parts by mass of the negative electrode active material was determined to be 1.5 parts by mass from the mass of the negative electrode precursor before formation of the first film, the mass of the negative electrode after formation of the first film, the composition of the negative electrode active material layer, and the specific gravity of each of the materials.

From the number of repetitions of a series of operations in ALD, the thickness of the first film was estimated to be within a range of 10 nm to 25 nm.

(2) Formation of Counter Electrode

A metal lithium foil having a thickness of 300 μm was punched into a disk shape having a diameter of 14 mm, which was used as a counter electrode.

(3) Preparation of Nonaqueous Electrolyte

A nonaqueous solvent was prepared by adding 1 part by mass of vinylene carbonate to 100 parts by mass of a mixture containing EC and EMC at a mass ratio of 1:3. Then, $LiPF_6$ was dissolved at a concentration of 1.0 mol/L in the nonaqueous solvent, preparing a nonaqueous electrolyte.

(4) Assembly of Coin-Shaped Cell

A bottomed cell case having an opening and made of stainless steel was prepared, and the negative electrode and the separator were disposed in this order inside the cell case. A nonwoven fabric made of polyphenylene sulfide (PPS) having a thickness of 0.45 mm was used as the separator. On the other hand, a sealing plate made of stainless steel was prepared, in which a gasket made of a resin, containing polypropylene, was provided in the peripheral portion, and a lithium foil as the counter electrode was attached to the inner side of the sealing plate. The nonaqueous electrolyte was injected into the cell case, and then the opening of the cell case was closed with the sealing plate, completing a coin-shaped cell ($A^1$). The cell size was 20 mm in diameter and 3.2 mm in thickness.

[Evaluation 1]

The negative electrode of the coin-shaped cell immediately after assembly was charged to 0 V at 25° C. and 0.1 mA and then discharged to 1.5 V. Thus, the first charging capacity C1 and the first discharging capacity D1 were obtained. Then, initial efficiency (E1) was determined by E1 (%)=100× D1/C1.

[Evaluation 2]

After the measurement of the initial efficiency (E1), the negative electrode of the coin-shaped cell was again charged to 0 V at 0.1 mA and then stored in a cell voltage state of 0 V at 60° C. for 5 days. Then, the negative electrode was discharged to 1.5 V to obtain the second discharging capacity F1. Then, the residual capacity rate (E2) was determined by E2 (%)=100× F1/D1.

[Evaluation 3]

The coin-shaped cell after measurement of the residual capacity rate (E2) was disassembled, and the negative electrode was taken out, washed with EMC, and then dried at 30° C. for 24 hours. Then, XPS analysis in the thickness direction was performed in a portion of the first film which coated the surfaces of the negative electrode active material layer and the negative electrode current collector. The analysis conditions are as follows.
 Line source: Al Kα
 Etching ion: Ar (2 keV)
As a result, in any case, the concentration C1 of phosphorus (P) has a maximum value in the direction from the surface side of the first film to the bonding interface between the first film and the negative electrode active material layer or to the bonding interface between the first film and the negative electrode current collector. The concentration $C1_{max}$ at the maximum vale was about two times as high as the concentration C1, on the surface side of the first film (a depth of 15% of the estimated thickness from the outermost surface of the first film).

Example 2

A battery A2 was produced and evaluated by the same methods as in Example 1 except that a first film was formed on a negative electrode active material layer by the following method.
 (i) In a reaction chamber housing a negative electrode precursor, lithium bis(trimethylsilyl)amide serving as a supply source of the element $M^1$ (silicon: Si) and lithium was vaporized and introduced as a first raw material. An atmosphere containing the raw material was controlled to a temperature of 120° C. and a pressure of 260 Pa. Thirty seconds after, the surface of the negative electrode precursor was considered to be coated with a monomolecular layer of the first raw material, and the excessive raw material was purged with nitrogen gas.
 (ii) Next, in the reaction chamber housing the negative electrode precursor, ozone serving as an oxidizer was introduced as a second raw material. An atmosphere containing the oxidizer was controlled to a temperature of 120° C. and a pressure of 260 Pa. Thirty seconds after, the monomolecular layer of the first raw material was considered to react with the oxidizer, and the excessive oxidizer was purged with nitrogen gas.
 (iii) A series of operations including introduction of the first raw material, purging, introduction of the second raw material, and purging was repeated 100 times to form a first film of a first lithium compound (first compound).
Analysis of the composition of the first film by XPS, ICP, etc. showed that the composition is lithium silicate having the composition formula $Li_4SiO_4$.

The mass of the first film per 100 parts by mass of the negative electrode active material was determined to be 1.5 parts by mass from the mass of the negative electrode precursor before formation of the first film, the mass of the negative electrode after formation of the first film, etc.

From the number of times of a series of operations in ALD, the thickness of the first film was estimated to be within a range of 10 nm to 25 nm.

Comparative Example 1

A battery B1 was produced and evaluated by the same methods as in Example 1 except that a negative electrode precursor without a first film formed by ALD was used as it was as a negative electrode.

Comparative Example 2

A battery B2 was produced and evaluated by the same methods as in Comparative Example 1 except that in forming a negative electrode active material layer, 1 part by mass of lithium phosphate ($Li_3PO_4$) relative to 100 parts by mass of natural graphite particles was mixed in a negative electrode slurry.

Comparative Example 3

A battery B3 was produced and evaluated by the same methods as in Comparative Example 1 except that in forming a negative electrode active material layer, 1 part by mass of lithium silicate ($Li_4SiO_4$) relative to 100 parts by mass of natural graphite particles was mixed in a negative electrode slurry.

The results of Examples 1 and 2 and Comparative Examples 1 to 3 are shown in Table 1.

TABLE 1

| Battery | Initial efficiency E1 (%) | Residual capacity rate E2 (%) | Concentration C1 Presence of maximum value | $C1_{max}/C1_{sr}$ |
| --- | --- | --- | --- | --- |
| A1 | 95 | 97 | Yes | 2 |
| A2 | 95 | 97 | Yes | 15 |
| B1 | 93 | 95 | — | — |
| B2 | 91 | 94 | — | — |
| B3 | 92 | 95 | — | — |

Table 1 indicates that the initial efficiency and residual capacity rate are improved by, after forming the negative electrode active material layer, coating the surface thereof with the first film having lithium ion permeability.

Example 3

A nonaqueous electrolyte secondary battery was produced according to the following procedures.
 (1) Formation of Negative Electrode
 Natural graphite particles (average particle diameter (D50): 50 μm) used as a negative electrode active material and a binder were mixed with a proper amount of water to prepare a negative electrode slurry. SBR and CMC were used in combination as the binder. The negative electrode slurry was prepared by mixing 1 part by mass and 1 part by mass of SBR and CMC, respectively, relative to 100 parts by mass of the natural graphite particles. Next, the resultant negative electrode slurry was applied on both surfaces of a copper foil (negative electrode current collector having a thickness of 10 μm), and then the coating film of a negative electrode mixture was dried and rolled by using a roller. Finally, the resultant laminate of the negative electrode current collector and the negative electrode mixture was cut into a predetermined electrode size, forming a negative electrode precursor having the negative electrode mixture layers on both surfaces of the negative electrode current collector.

A first film was formed on the surface of the resultant negative electrode precursor by the same method as in Example 1.
 (2) Formation of Positive Electrode
 A lithium transition metal oxide (($LiNi_{0.88}Co_{0.09}Al_{0.03}O_2$ (NCA); positive electrode active material) containing Li, Ni, Co, and Al, acetylene black (AB; conductive material), polyvinylidene fluoride (PVdF; binder) were mixed at a mass ratio of NCA:AB:PVdF=100:1:0.9, and a proper amount of N-methyl-2-pyrrolidone (NMP) was further added and stirred, preparing a positive electrode slurry.

Next, the resultant positive electrode slurry was applied on both surfaces of an aluminum foil (positive electrode current collector), and then the coating film of a positive electrode mixture was dried and rolled by using a roller. Finally, the resultant laminate of the positive electrode current collector and the positive electrode mixture was cut into a predetermined electrode size, forming a positive electrode having the positive electrode mixture layers on both surfaces of the positive electrode current collector.

(3) Preparation of Nonaqueous Electrolyte

A nonaqueous electrolyte was prepared by the same method as in Example 1.

(4) Formation of Battery

A positive electrode lead made of Al was attached to the positive electrode formed as described above. A negative electrode lead made of Ni was attached to the negative electrode formed as described above. The positive electrode and the negative electrode were helically wound through a separator having a thickness of 0.015 mm and containing PP and PE, thereby forming a wound-type electrode group.

The resultant wound-type electrode group was inserted into a bottomed cylindrical battery case having an opening and made of a nickel-plated iron plate. The other end of the negative electrode lead was connected to the inside wall of the battery case, and the other end of the positive electrode lead was connected to the bottom of the sealing plate. Further, a ring-shaped insulating gasket was mounted on the peripheral portion of the sealing plate. Then, a predetermined amount of the nonaqueous electrolyte was injected into the battery case. The sealing plate made of nickel-plated iron was disposed on the opening part of the battery case, and the opening was sealed by caulking the opening end portion of the battery case to the peripheral portion of the sealing plate with the gasket interposed therebetween. Thus, a nonaqueous electrolyte secondary battery X1 (diameter: 18 mm, height: 65 mm) was produced.

[Evaluation 4]

Immediately after assembly, the nonaqueous electrolyte secondary battery was charged to 50% of the capacity and then aged by being allowed to stand at 45° C. for 72 hours. Next, the secondary battery was charged at a constant current of 0.02 C until the closed-circuit voltage of the battery reached 4.2 V, then discharged at a constant current of 0.2 C until the closed-circuit voltage of the battery reached 2.5 V, and then discharged at 0.05 C. The charging/discharging was performed in an environment of 25° C. As a result, the first charging capacity C2 and the first discharging capacity D2 were obtained. The discharging capacity D2 was a total of the discharging capacity in discharging at 0.2 C and the discharging capacity in discharging at 0.05 C. In addition, the initial efficiency (E3) was determined by E3 (%)=100×D2/C2. The result is shown in Table 2.

Example 4

A second film having the same composition and same thickness as those of the first film was formed on the surface of the positive electrode produced in Example 3 by the same method using the same raw material as the first film of Example 1, thereby forming a positive electrode provided with the second film. A nonaqueous electrolyte secondary battery X2 was produced and evaluated by the same methods as in Example 3 except that the resultant positive electrode was used.

Comparative Example 4

A nonaqueous electrolyte secondary battery Y1 was produced and evaluated by the same method as in Example 3 except that a negative electrode precursor without a first film formed thereon was used as it was as a negative electrode.

TABLE 2

| Battery | Initial efficiency E3 (%) |
| --- | --- |
| X1 | 88.5 |
| X2 | 89.8 |
| Y1 | 85.6 |

Table 2 indicates that the battery X1 produced by forming the negative electrode active material layer and then coating the surface of the negative electrode active material layer with the first film having lithium ion permeability is more improved in initial efficiency than the battery Y1. Further, the battery X2 produced by further coating the surface of the positive electrode active material layer with the second film is more improved in initial efficiency than the battery X1 and the battery Y1.

The negative electrode according to the present invention is useful as a negative electrode of a nonaqueous electrolyte secondary battery used for driving power supplies of a personal computer, a cellular phone, a mobile device, a personal digital assistant (PDA), a portable game device, a video camera, and the like; main or auxiliary power supplies for driving electric motors in a hybrid electric vehicle, a fuel cell vehicle, a plug-in HEV, and the like; driving power supplies of an electrical tool, a cleaner, a robot, and the like.

REFERENCE SIGNS LIST

1: nonaqueous electrolyte secondary battery
10: wound-type electrode group
11: prismatic battery case
12: sealing plate
13: negative electrode terminal
14: positive electrode lead
15: negative electrode lead
16: gasket
17: plug
17a: injection hole
18: frame body

The invention claimed is:

1. A method for producing a negative electrode for a nonaqueous electrolyte secondary battery, the method comprising:
 a step of preparing a negative electrode precursor including a negative electrode current collector and a negative electrode active material layer provided on the surface of the negative electrode current collector; and
 a step of coating at least a portion of the surface of the negative electrode active material layer and partially coating the surface of the negative electrode current collector with a first film having lithium ion permeability,
 wherein the first film is formed by exposing the negative electrode precursor in an atmosphere containing a raw material of the first film at 200° C. or less, and wherein the first film contains a first lithium compound containing an element $M^1$, an element $A^1$, and lithium;
 $M^1$ is at least one selected from the group consisting of P, Si, B, V, Nb, W, Ti, Zr, Al, Ba, La, and Ta; and
 $A^1$ is at least one selected from the group consisting of F, S, O, N, and Br,
 wherein, in the first film, the concentration of the first lithium compound is low on the surface side of the first film, and is high on the bond interface side between the first film and the negative electrode active material layer or on the bond interface side between the first film and the negative electrode current collector.

2. The method for producing a negative electrode for a nonaqueous electrolyte secondary battery according to claim 1,
wherein the first film is formed by an atomic layer deposition method.

3. The method for producing a negative electrode for a nonaqueous electrolyte secondary battery according to claim 1, the method comprising:
a step of housing a negative electrode precursor in a reaction chamber after the step of preparing the negative electrode precursor,
a step of vaporizing and introducing a first raw material serving as a supply source of the element $M^1$ and the element $A^1$ into the reaction chamber, and
a step of vaporizing and introducing a second raw material serving as a supply source of lithium into the reaction chamber.

4. A nonaqueous electrolyte secondary battery comprising a positive electrode, a negative electrode, and a lithium-ion conductive nonaqueous electrolyte,
wherein the negative electrode includes a negative electrode current collector, a negative electrode active material layer provided on the surface of the negative electrode current collector, and a first film which has lithium ion permeability and which coats at least a portion of the surface of the negative electrode active material layer and partially coats the surface of the negative electrode current collector,
wherein the positive electrode includes a positive electrode current collector, a positive electrode active material layer provided on the surface of the positive electrode current collector, and a second film which has lithium ion permeability and which coats at least a portion of the surface of the positive electrode active material layer and partially coats the surface of the positive electrode current collector,
wherein the positive electrode active material layer contains positive electrode active material particles and a binder, and
wherein the positive electrode active material particles are represented by the following composition formula:

$Li_aNi_bM^3{}_{1-b}O_2$ (in the formula, $M^3$ is at least one selected from the group consisting of Mn, Co, and Al, $0<a\le1.2$, and $0.85<b\le1$),
wherein the first film contains a first lithium compound containing an element $M^1$, an element $A^1$, and lithium:
$M^1$ is at least one selected from the group consisting of P, Si, B, V, Nb, W, Ti, Zr, Al, Ba, La, and Ta; and
$A^1$ is at least one selected from the group consisting of F, S, O, N, and Br,
wherein in the first film, the concentration of the first lithium compound is low on the surface side of the first film, and is high on the bond interface side between the first film and the negative electrode active material layer or on the bond interface side between the first film and the negative electrode current collector.

5. The nonaqueous electrolyte secondary battery according to claim 4,
wherein the negative electrode active material layer contains negative electrode active material particles and a binder; and
the first film further partially coats the surface of the binder.

6. The nonaqueous electrolyte secondary battery according to claim 5,
wherein the bond interfaces between the negative electrode active material particles and the binder have a region without the first film interposed therebetween.

7. The nonaqueous electrolyte secondary battery according to claim 5,
wherein the contact interfaces between the negative electrode active material particles and the negative electrode current collector or the contact interfaces between the adjacent negative electrode active material particles have a region without the first film interposed therebetween.

8. The nonaqueous electrolyte secondary battery according to claim 4,
wherein the second film contains a second lithium compound represented by the following composition formula:

$Li_{x2}M^2A^2{}_{y2}$ (in the formula, $M^2$ is at least one selected from the group consisting of P, Si, B, V, Nb, W, Ti, Zr, Al, Ba, La, and Ta, $A^2$ is at least one selected from the group consisting of F, S, O, N, and Br, $0.5\le x2\le4$, and $1\le y2\le6$).

* * * * *